US006536000B1

(12) United States Patent
Jackson et al.

(10) Patent No.: US 6,536,000 B1
(45) Date of Patent: Mar. 18, 2003

(54) COMMUNICATION ERROR REPORTING MECHANISM IN A MULTIPROCESSING COMPUTER SYSTEM

(75) Inventors: Christopher J. Jackson, Westford, MA (US); Erik E. Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/419,823

(22) Filed: Oct. 15, 1999

(51) Int. Cl.[7] .............................................. G06F 15/16
(52) U.S. Cl. ......................................... 714/57; 714/48
(58) Field of Search .............................. 714/18, 44, 45, 714/48, 57, 25, 31, 43, 56

(56) References Cited

U.S. PATENT DOCUMENTS

| 3,648,256 A | * | 3/1972 | Paine et al. ................. 709/230 |
| 4,100,605 A | * | 7/1978 | Holman ........................ 714/25 |
| 4,589,068 A | * | 5/1986 | Heinen, Jr. ................... 714/37 |
| 4,674,038 A | | 6/1987 | Brelsford et al. |
| 5,019,971 A | | 5/1991 | Lefsky et al. |

(List continued on next page.)

FOREIGN PATENT DOCUMENTS

EP          0 817 051          1/1998

OTHER PUBLICATIONS

Ekanadham,K.; Beng–Hong Lim; Pattnaik, P.; Snir, M.; "Prism: an integrated architecture for scalable shared memory", High–Performance Computer Architecture, 1998. Proceedings., 1998 Fourth International Symposium on, 1998, pp. 140–151.*
"Two–Phase Resource Queries with a Suppressible Second Phase," IBM Technical Disclosure Bulletin, pp. 357–359.

International Search Report, Application No. PCT/US 00/28266, mailed Feb. 8, 2001.
Lenosky, "The Description and Analysis of DASH: A Scalable Directory–Based Multiprocessor," DASH Prototype System, Dec. 1991, pp. 36–56.

(List continued on next page.)

Primary Examiner—Robert Beausoliel
Assistant Examiner—Gabriel L. Chu
(74) Attorney, Agent, or Firm—Meyertons Hood Kivlin Kowert & Goetzel, P.C.; B. Noël Kivlin

(57) ABSTRACT

A multiprocessing computer system includes a plurality of processing nodes, each having one or more processors, a memory, and a system interface. The plurality of processing nodes may be interconnected through a global interconnect network which supports cluster communications. The system interface of an initiating node may launch a request to a remote node's memory or I/O. The computer system implements an error communication reporting mechanism wherein errors associated with remote transactions may be reported back to a particular processor which initiated the transaction. Each processor includes an error status register that is large enough to hold a transaction error code. The protocol associated with a local bus of each node (i.e., a bus interconnecting the processors of a node to the node's system interface) includes acknowledgement messages for transactions when they have completed. In the event a transaction which is transmitted by a system interface upon the global interconnect network on behalf of a particular processor incurs an error, the system interface sets an error flag in the acknowledgement message and provides an associated error code. If the acknowledgement message denotes an error, the error code is written into the processor's error status register for later retrieval by software. In various embodiments, a system interface may acknowledge a transaction to a given processor early (even if that transaction has not completed globally) if a subsequent transaction from the same processor is pending in the interface.

24 Claims, 8 Drawing Sheets

U.S. PATENT DOCUMENTS

| | | | |
|---|---|---|---|
| 5,113,514 A | | 5/1992 | Albonesi et al. |
| 5,155,731 A | | 10/1992 | Yamaguchi |
| 5,210,869 A | * | 5/1993 | Williams .................... 709/206 |
| 5,253,359 A | | 10/1993 | Spix et al. |
| 5,311,591 A | * | 5/1994 | Fischer ....................... 370/466 |
| 5,355,471 A | | 10/1994 | Weight |
| 5,406,504 A | | 4/1995 | Denisco et al. |
| 5,418,794 A | | 5/1995 | Stebbins et al. |
| 5,418,927 A | | 5/1995 | Chang et al. |
| 5,428,766 A | | 6/1995 | Seaman |
| 5,428,771 A | * | 6/1995 | Daniels ....................... 714/11 |
| 5,452,430 A | | 9/1995 | Dievendorff et al. |
| 5,463,768 A | | 10/1995 | Cuddihy et al. |
| 5,491,788 A | | 2/1996 | Cepulis et al. |
| 5,504,859 A | * | 4/1996 | Gustafson et al. .......... 708/104 |
| 5,557,748 A | | 9/1996 | Norris |
| 5,574,849 A | | 11/1996 | Sonnier et al. |
| 5,581,713 A | | 12/1996 | Myers et al. |
| 5,598,550 A | | 1/1997 | Shen et al. |
| 5,608,878 A | | 3/1997 | Arimilli et al. |
| 5,615,335 A | | 3/1997 | Onffroy et al. |
| 5,619,644 A | | 4/1997 | Crockett et al. |
| 5,629,950 A | | 5/1997 | Godiwala et al. |
| 5,673,390 A | * | 9/1997 | Mueller ....................... 709/107 |
| 5,758,184 A | * | 5/1998 | Lucovsky et al. .......... 340/3.21 |
| 5,764,155 A | * | 6/1998 | Kertesz et al. ................ 707/10 |
| 5,799,305 A | * | 8/1998 | Bortvedt et al. ............ 345/835 |
| 5,832,496 A | * | 11/1998 | Anand et al. ................. 707/10 |
| 5,862,316 A | | 1/1999 | Hagersten et al. |
| 6,151,599 A | * | 11/2000 | Shrader et al. ................ 707/10 |
| 6,249,836 B1 | * | 6/2001 | Downs et al. ................. 703/27 |
| 6,253,326 B1 | * | 6/2001 | Lincke et al. ............... 380/255 |
| 6,304,967 B1 | * | 10/2001 | Braddy ......................... 713/150 |
| 6,418,544 B1 | * | 7/2002 | Nesbitt et al. .............. 709/224 |
| 2001/0032254 A1 | * | 10/2001 | Hawkins ..................... 709/219 |

OTHER PUBLICATIONS

Cox et al., "Adaptive Cache Coherency for Detecting Migratory Shared Data,"© 1993 IEEE, pp. 98–108.

Stenström et al., "An Adaptive Cache Coherence Protocol Optimized for Migratory Sharing,"© 1993 IEEE, pp. 109–118.

Weber et al., "Analysis of Cache Invalidation Patterns in Multiprocessors,"© 1989 ACM, pp. 243–256.

Gharachorloo et al., "Two Techniques to Enhance the Performance of Memory Consistency Models," 1991 Int'l Conference on Parallel Processing, pp. 1–10.

Li et al., "Memory Coherence in Shared Virtual Memory Systems,"© 1986 ACM, pp. 229–239.

Hagersten et al. "Simple COMA Node Implementations," Swedish Institute of Computer Science, 10 pp.

Saulsbury et al., "An Argument for Simple COMA," Swedish Institute of Computer Science, 10 pp.

Hagersten et al., "Simple COMA," Swedish Institute of Computer Science, Jul. 1993, pp. 233–259.

* cited by examiner

COMMUNICATION ERROR REPORTING MECHANISM IN A MULTIPROCESSING COMPUTER SYSTEM

BACKGROUND OF THE INVENTION

1. Field of the Invention

This invention relates to the field of multiprocessor computer systems and, more particularly, to communication error reporting mechanisms in multiprocessor computer systems.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

Another approach for implementing multiprocessing computer systems is a scalable shared memory (SSM) architecture (also referred to as a distributed shared memory architecture). An SSM architecture includes multiple nodes within which processors and memory reside. The multiple nodes communicate via a network coupled therebetween. When considered as a whole, the memory included within the multiple nodes forms the shared memory for the computer system. Typically, directories are used to identify which nodes have cached copies of data corresponding to a particular address. Coherency activities may be generated via examination of the directories.

SSM systems are scaleable, overcoming the limitations of the shared bus architecture. Since many of the processor accesses are completed within a node, nodes typically have much lower bandwidth requirements upon the network than a shared bus architecture must provide upon its shared bus. The nodes may operate at high clock frequency and bandwidth, accessing the network when needed. Additional nodes may be added to the network without affecting the local bandwidth of the nodes. Instead, only the network bandwidth is affected.

In a typical SSM system, a global domain is created by way of the SSM protocol which makes all the memory attached to the global domain look like one shared memory accessible to all of its processors. A global domain typically runs a single kernel. Hardware provides conventional MMU (memory management unit) protection, and the kernel manages mappings (e.g. reloading of key registers on context switches) to allow user programs to co-exist without trusting one another. Since the nodes of a global domain share memory and may cache data, a software error in one node may create a fatal software error which may crash the entire system. Similarly, a fatal hardware error in one node will typically cause the entire global domain to crash.

Accordingly, in another approach to multiprocessing computer systems, clustering may be employed to provide greater fault protection. Unlike SSM approaches, the memory of one node in a cluster system is not freely accessible by processors of other cluster nodes. Likewise, the I/O of one node is typically not freely accessible by processors of other nodes. While memory is not freely shared between nodes of a cluster, a cluster allows nodes to communicate with each other in a protected way using an interconnection network which may be initialized by the operating system. Normally, each node of a cluster runs a separate kernel. Nodes connected in a cluster should not be able to spread local faults, both hardware and software, that would crash other nodes.

Cluster systems are often built on communication mechanisms which are less reliable than, for instance, SMP buses, since they must connect computers in separate chassis which may be separated by substantial distances. Because of this, cluster operations may incur errors, and application programs must be informed of these errors so that they can take appropriate recovery steps.

An ideal error reporting mechanism would be completely accurate and easy to use. Currently-used technology has various limitations in this area. For instance, interfaces which do not provide process-virtualized error information, but log errors on a controller- or system-wide basis, may cause processes which were not responsible for an error to incur error recovery overhead. On the other hand, interfaces which report error information directly to an initiating processor in the form of a processor fault or trap are less easy to use, since many programming languages do not cleanly support the handling of asynchronous errors.

It is accordingly desirable that a cluster communication interconnect be able to tolerate communication errors, and that it be able to report those errors to the software responsible for them. For maximum efficiency, it is desirable that the interconnect be able to provide error information directly to an application process, rather than to the operating system.

In one approach to communication error reporting in a cluster system, a number of cluster error status registers are embedded in each communications interface. Each of these registers is associated with a particular processor in the multiprocessor computer system. When a cluster operation initiated by one of the processors incurs an error, the interface notes that error in the cluster error status register associated with that processor. Applications may read their cluster error status register whenever they wish to check the status of previously performed cluster operations. The per-processor cluster error status registers are saved and restored on processor context switches, thus providing virtual-per application cluster error status registers to every operating system process.

Systems employing such approaches to communication error reporting suffer from various drawbacks. For example, in a system which contains multiple cluster interfaces, an application which wants to ascertain the status of its operations may need to read multiple cluster error status registers, one from each cluster interface. This increases the time needed to perform a complete messaging operation. In addition, the operating system must save and restore multiple cluster error status registers for each process during a context switch. This increases context switch time and thus adds to the general overhead imposed by the operating system.

Another drawback to such systems is that the cluster interface must contain cluster error status registers for all processors which could possibly be part of any machine in which it is installed. This adds to the cost of the interface, which is a particular drawback when trying to develop a high-volume, low cost implementation which is usable in multiple types of systems.

It is thus desirable to provide a fast and reliable error communication mechanism in a multiprocessing computer system which allows for efficient and scalable implementations of user and kernel-level communication protocols.

SUMMARY OF THE INVENTION

The problems outlined above may in large part be solved by a communication error reporting mechanism in accordance with the present invention. In one embodiment, a multiprocessing computer system includes a plurality of processing nodes, each including one or more processors, a memory, and a system interface. The plurality of processing nodes may be interconnected through a global interconnect network which supports cluster communications. The system interface of an initiating node may launch a request to a remote node's memory or I/O. The computer system implements an error communication reporting mechanism wherein errors associated with remote transactions may be reported back to a particular processor which initiated the transaction. Each processor includes an error status register that is large enough to hold a transaction error code. The protocol associated with a local bus of each node (i.e., a bus interconnecting the processors of a node to the node's system interface) includes acknowledgement messages for transactions when they have completed. In the event a transaction which is transmitted by a system interface upon the global interconnect network on behalf of a particular processor incurs an error, the system interface sets an error flag in the acknowledgement message and provides an associated error code. If the acknowledgement message denotes an error, the error code is written into the processor's error status register for later retrieval by software. In various embodiments, a system interface may acknowledge a transaction to a given processor early (even if that transaction has not completed globally) if a subsequent transaction from the same processor is pending in the interface.

Advantageously, the per-processor error status registers may be saved and restored on processor context switches, thus providing virtual per-application cluster error status registers to every operating system process. Improved scaling may be attained in embodiments employing multiple system interfaces since only a single error status register needs to be read on an error check or context switch. Additionally, a processor may perform a read to its associated error status register without executing a cycle upon the local bus. Still further, errors may be reported without processor faults or traps.

BRIEF DESCRIPTION OF THE DRAWINGS

Other objects and advantages of the invention will become apparent upon reading the following detailed description and upon reference to the accompanying drawings in which.

Figure 1:
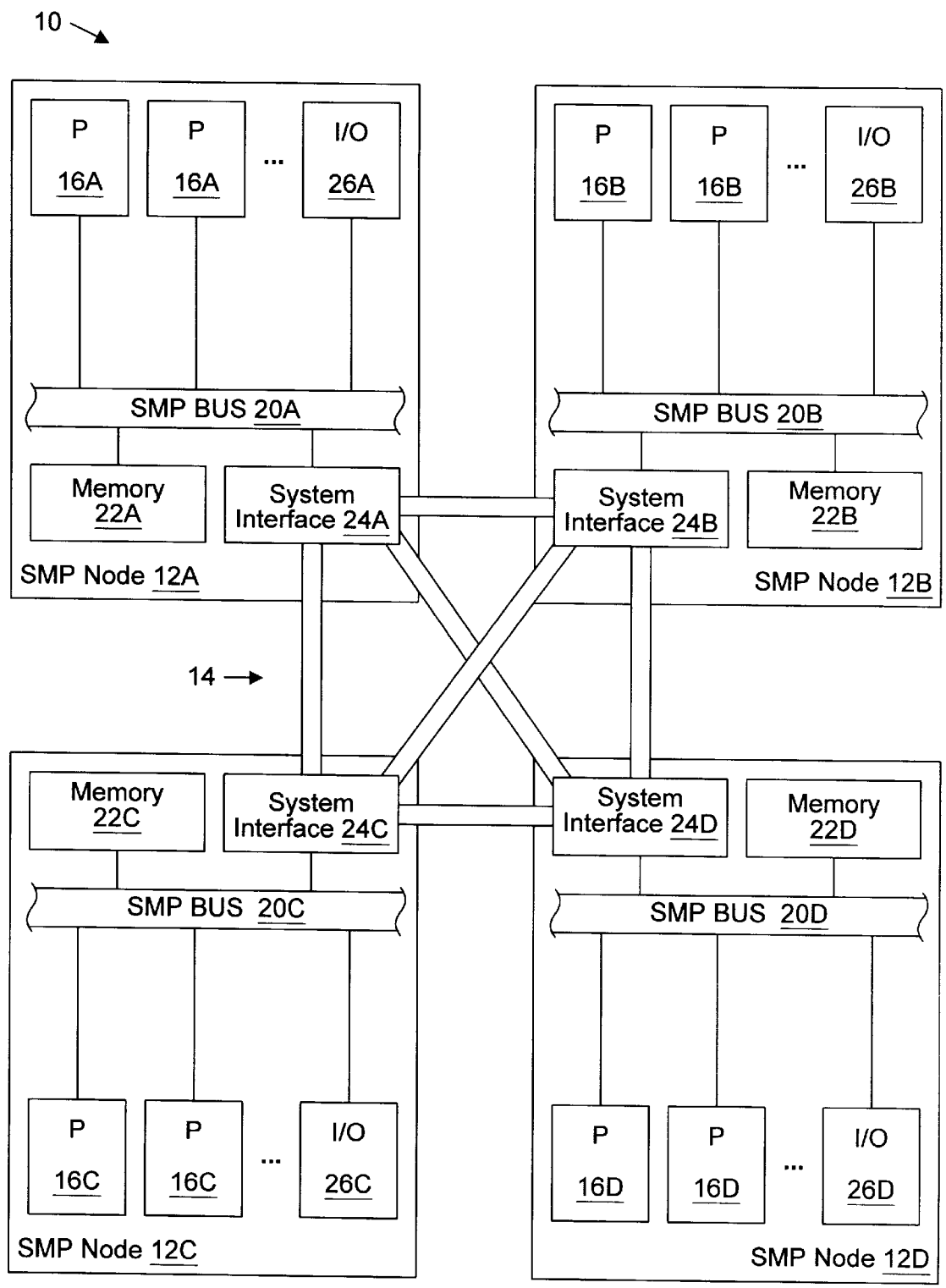
FIG. 1 is a block diagram of a multiprocessor computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a multiprocessing computer system 10 is shown. Computer system 10 includes multiple SMP nodes 12A–12D interconnected by a point-to-point network 14. Each SMP node includes multiple processors, a local bus, a memory, and a system interface. For example, SMP node 12A includes processors 16A, an SMP bus 20A, a memory 22A, and a system interface 24A. SMP nodes 12B–12D are configured similarly. Each SMP node may further include one or more input/output (I/O) interfaces (e.g., I/O interfaces 26A–26D) which are used to interface to peripheral devices such as serial and parallel ports, disk drives, modems, printers, and so on.

Elements referred to herein with a common reference number followed by a particular letter will be collectively referred to by the reference number alone. For example, SMP nodes 12A–12D will be collectively referred to as SMP nodes 12.

Each SMP node 12 is essentially an SMP system having its corresponding memory 22 as the shared memory. Processors 16 are high performance processors. In one embodiment, each processor 16 is a SPARC™ processor compliant with version 9 of the SPARC™ processor architecture. It is noted, however, that any processor architecture may be employed by processors 16. It is further noted that each of the processors 16 includes an appropriate interface to support the protocols associated with each SMP bus 20, as will be described further below. Each of the processors 16 may additionally include cache memory subsystems.

SMP bus 20 accommodates communication between processors 16, memory 22, system interface 24, and I/O interface 26. In one embodiment, SMP bus 20 includes an address bus and related control signals, as well as a data bus and related control signals. Because the address and data buses are separate, a split-transaction bus protocol may be employed upon SMP bus 20. Generally speaking, a split-transaction bus protocol is a protocol in which a transaction occurring upon the address bus may differ from a concurrent transaction occurring upon the data bus. Transactions involving address and data include an address phase in which the address and related control information are conveyed upon the address bus, and a data phase in which data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a given transaction may be identified via a unique tag.

In one embodiment, each transaction conveyed upon SMP bus 20 includes a field (or control signals) which identifies the particular CPU which initiated the transaction. A particular processor 16 may initiate a read operation upon SMP bus 20 by asserting certain control signals and conveying the address of the requested data upon SMP bus 20. This corresponds to the address phase of a read operation. When the target device has the requested data available, the data is conveyed upon SMP bus 20 and is provided to the initiator during a data phase. When the requested data resides in a remote node, system interface 24 conveys the request across network 14, and, upon receipt of the data from the remote node, provides the read data to the initiator via SMP bus 20.

For write operations, a particular processor 16 may indicate its intent to perform a write by conveying the destination address during an address phase upon SMP bus 20. The target then issues a message indicating it is ready to accept the data, and indicates where the initiator should send the data (e.g., to an allocated internal buffer of the target). The initiator subsequently sends the data across SMP bus 20 during a data phase. Similar to read transactions, if the destination for a write transaction resides in a remote node, the corresponding system interface 24 handles the transaction globally on behalf of the initiating processor. It is noted that in other embodiments, other specific protocols may be supported by each SMP bus 20.

Computer system 10 may be operable in a cluster mode. When operating in a cluster mode, the memory of one node is not freely accessible by processors of other cluster nodes. Likewise, the I/O of one node is typically not freely accessible by processors of other nodes. Instead, the system interface 24 of each node 12 includes cluster management functionality which is operable to determine whether a particular remote node is allowed access to that node's memory or I/O. The system interface of each node also detects transactions upon SMP bus 20 which require a transfer to another SMP node 12. System interface 24 performs the transfers and tracks the transactions until they have completed in the remote nodes. The cluster configuration is typically maintained by the operating system kernel.

In the embodiment shown, system interface 24 is coupled to a point-to-point network 14. In a point-to-point network, individual connections exist between each node upon the network. A particular node communicates directly with a second node via a dedicated link. To communicate with a third node, the particular node utilizes a different link than the one used to communicate with the second node. Alternatively, the point to point network 14 may be configured such that a particular node may be used as a "hop" to pass through communications between a sending node and a receiving node. That is, the network is arranged such that communications from a sending node to a particular receiving node must pass through a hop node. By configuring the network using hop nodes, the cost of the system may be reduced, and the interconnect network may be simplified.

It is noted that, although four SMP nodes 12 are shown in FIG. 1, embodiments of computer system 10 employing any number of nodes are contemplated. Additionally, in other embodiments, global interconnects other than a point-to-point network may be employed to interconnect and facilitate communication between the processing nodes, such as a broadcast network. As used herein, a processing node is a data processing subsystem including at least one processor, a corresponding memory, and circuitry for communicating with other processing nodes.

It is further noted that embodiments are also contemplated wherein a plurality of nodes are configured to operate in an SSM mode of operation with respect to each other, but that collectively form a cluster node within a cluster that includes other cluster nodes.

It is finally noted that various specific implementations of computer system 10 are possible. For example, aspects of computer system 10 may be implemented in accordance with details disclosed in the commonly assigned, co-pending patent application entitled "Multiprocessor Computer System Employing a Mechanism for Routing Communication Traffic Through a Cluster Node" filed Sep. 4, 1998, Ser. No. 09/948,736, the disclosure of which is incorporated herein in its entirety.

As discussed previously, it is possible that communication errors will occur in systems such as computer system 10 when a transaction which requires access to the memory or I/O of another node is transmitted from a particular node across network 14. For example, it is possible that a node receiving the transaction will determine that the requesting node does not have access rights to the address specified in the transaction, as determined by the cluster management functionality. Similarly, the node to which a particular transaction is sent may not respond at all. Other various types of errors are also possible, such as destination busy errors, invalid transaction errors, access violation errors, read-only data errors, non-existent node errors, general communication errors, and so on. Accordingly, computer system 10 implements an error communication reporting mechanism wherein errors associated with remote transactions (that is, transactions that are transmitted to remote nodes) may be reported back to a particular processor 16 which initiated the transaction. More particularly, and as will be described in further detail below, each processor 16 includes an error status register which is large enough to hold a transaction error code. The protocol associated with each SMP bus 20 is extended to include acknowledgement messages for transactions when they have completed. In the event a transaction which is transmitted by a system interface 24 upon network 14 on behalf of a particular processor incurs an error, the system interface sets an error flag in the acknowledgement message and provides an associated error code. If the acknowledgement message denotes an error, the error code is written into the processor's error status register for later retrieval by software. Advantageously, the per-processor error status registers are saved and restored on processor context switches, thus providing virtual per-application cluster error status registers to every operating system process. Further details regarding a particular implementation of the error reporting mechanism are provided further below in conjunction with FIGS. 4 and 5.

Figure 2:
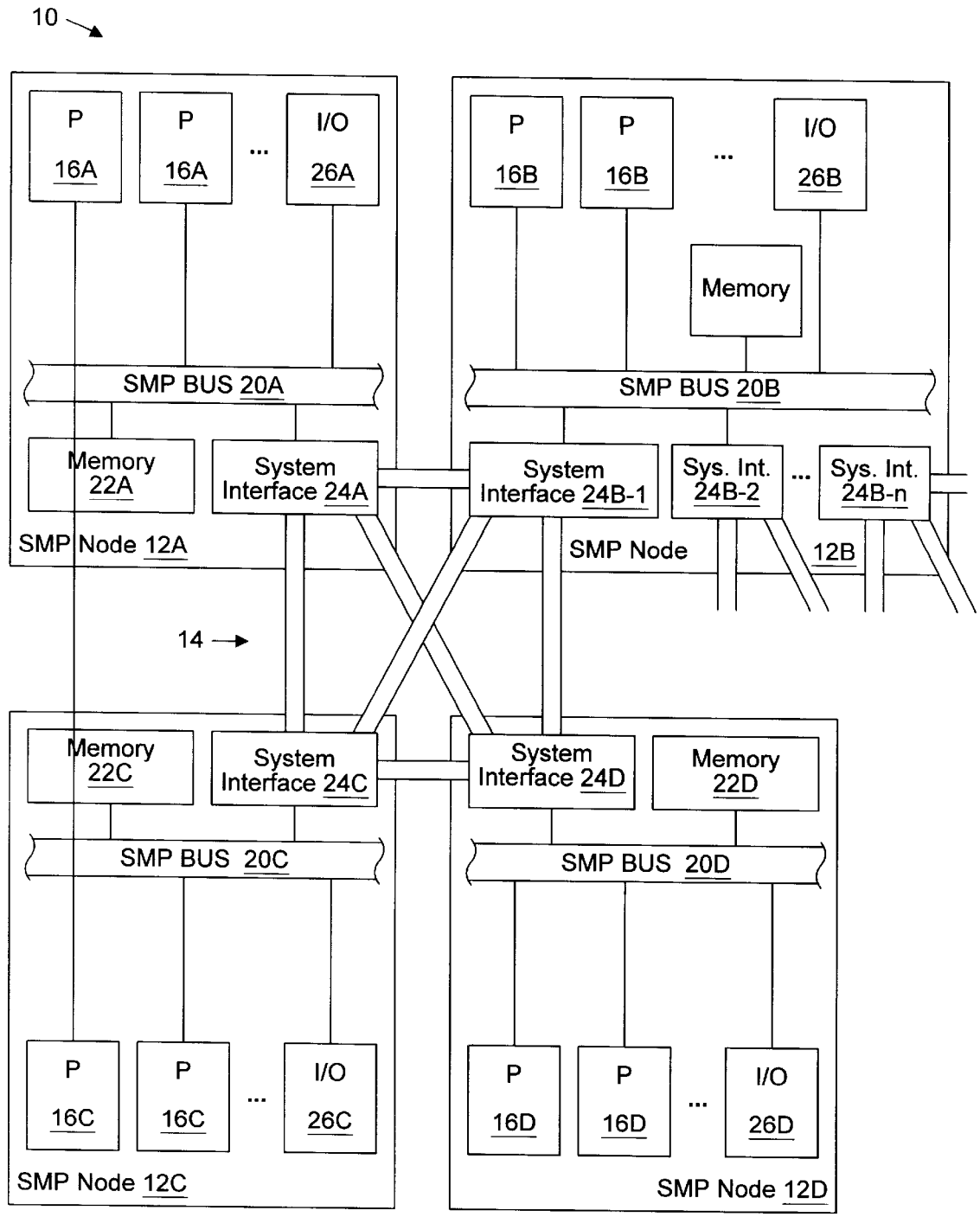
FIG. 2 is a block diagram of another embodiment of a multiprocessor computer system.

Prior to discussing details of the error reporting mechanism, it is first noted that several system interfaces may reside within a single node. For example, FIG. 2 illustrates an exemplary system in which node 12B includes a plurality of system interfaces 24B-1 through 24B-n. Each system interface 24, which may be implemented as an integrated circuit chip, includes a finite number of ports to support point-to-point connections to other nodes. Accordingly, by including several system interfaces within a common node, greater connectivity to additional nodes may be achieved.

Different system interfaces 24 may also be provided and initialized to handle only a subset of the accesses for a particular address slice (e.g., address region). For example, one interface may handle even addresses while another interface handles odd addresses. In this way, having more than one interface may increase the bandwidth provided to one specific node.

Figure 3:
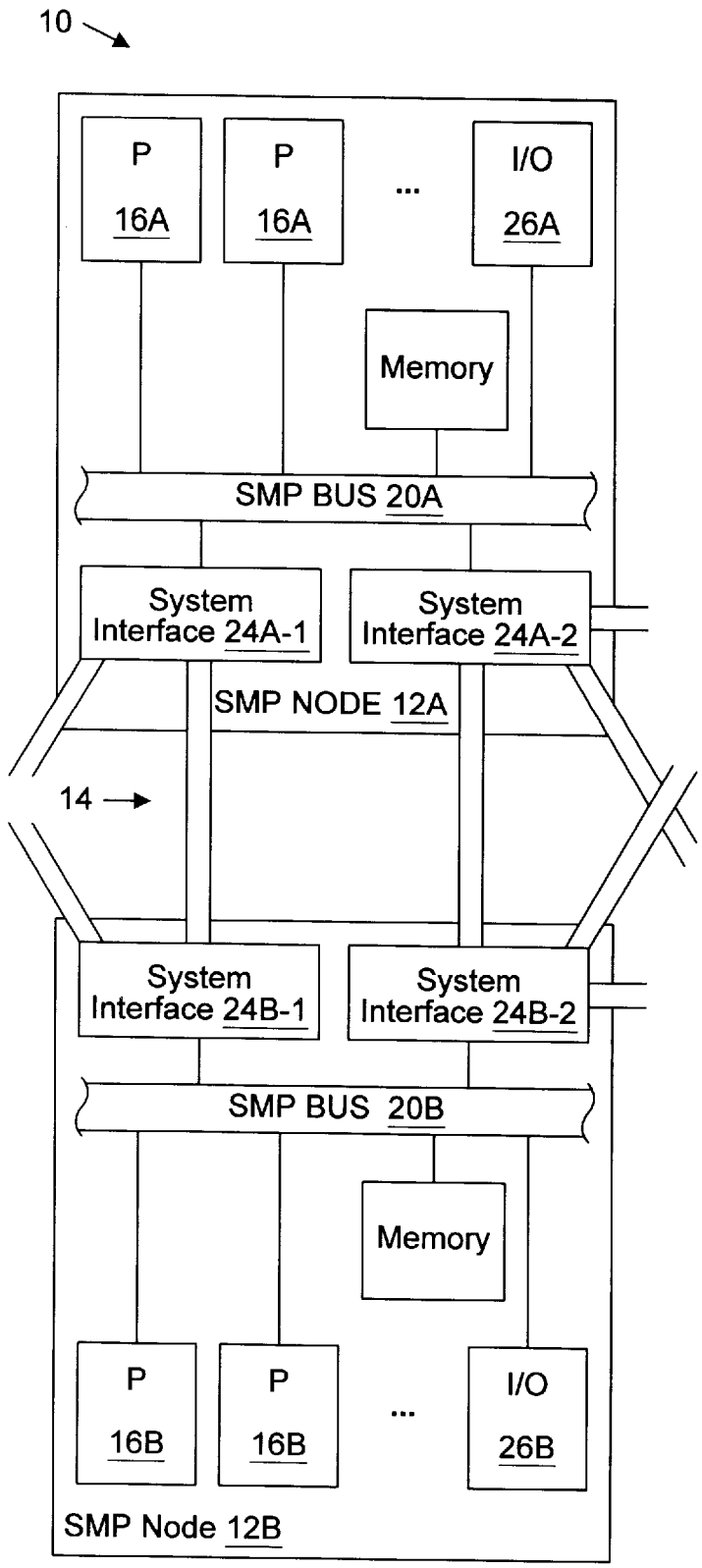
FIG. 3 is a block diagram of yet another embodiment of a multiprocessor computer system.

This concept may be better understood with reference to FIG. 3. FIG. 3 illustrates an exemplary system configuration wherein a node 12A includes a pair of system interfaces 24A-1 and 24A-2, each coupled to provide selected cluster communications to corresponding system interfaces 24B-1 and 24B-2 of node 12B. In this configuration, system interfaces 24A-1 and 24A-2 may be initialized such that system interface 24A-1 handles even addresses for a particular address slice, while system interface 24A-2 handles odd addresses. This "data striping" thus provides increased bandwidth to node 12B for accesses to that slice, since the burden associated with such transfers is spread between the system interfaces.

Figure 4:
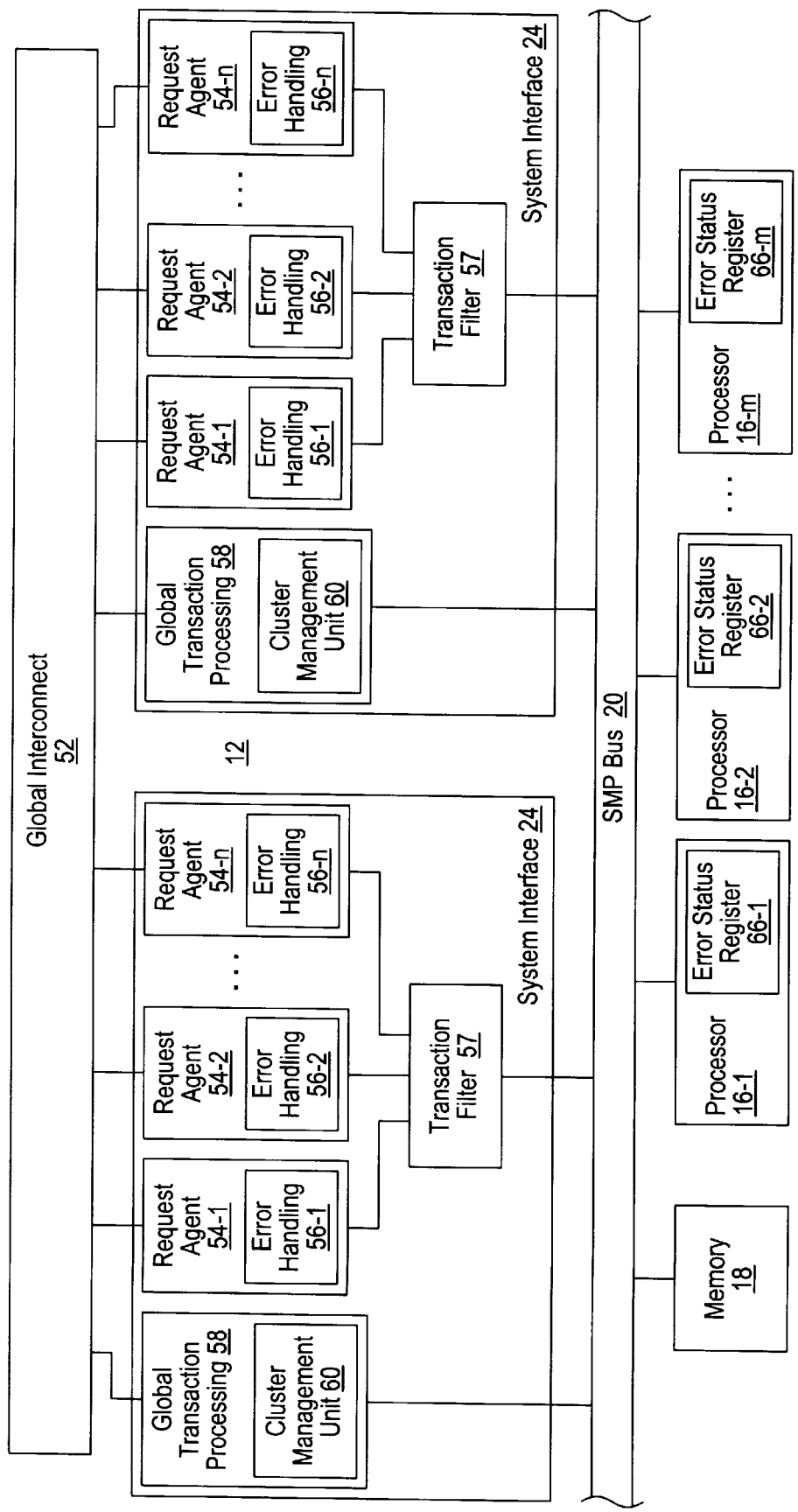
FIG. 4 is a block diagram illustrating aspects a node of a multiprocessor computer system.

The handling of inter-node communication errors within the systems described above is next considered. FIG. 4 is a block diagram illustrating aspects of one embodiment of a node 12 including a pair of system interfaces 24 coupled between a global interconnect 52 and an SMP bus 20. A plurality of processors 16-1 through 16-m and a memory 18 are further shown coupled to SMP bus 20.

As illustrated, each system interface 24 includes a plurality of request agents 54-1 through 54-n. Each request agent 54 includes an error handling subsystem 56-1 through 56-n, respectively. A transaction filter 57 of each system interface 24 is shown coupled between request agents 54-1 through 54-n and SMP bus 20. A global transaction processing unit 58 within each system interface 24 is further shown coupled between global interconnect 52 and SMP bus 20. A cluster management unit 60 is depicted within each global transaction processing unit 58.

During operation, transaction filter 57 monitors transactions initiated upon SMP bus 20 to determine whether a given transaction must be conveyed globally to another node via global interconnect 52. This may be determined by the address of the transaction. Each of request agents 56-1 through 56-n is capable of receiving a transaction initiated upon SMP bus 20 through transaction filter 56, and is configured to transmit a corresponding transaction via global interconnect 52 to a destination remote node on behalf of the initiating processor 16. In this particular embodiment, each request agent 56 is capable of handling a single outstanding transaction at a time, and tracks the transaction until it has completed.

The global transaction processing unit 58 of each system interface 24 is provided to receive incoming requests from remote notes, and to convey the requests to SMP bus 20, when appropriate. When the global transaction processing unit 58 of a given system interface receives a transaction from a remote node, the associated cluster management unit 60 determines whether access from the remote node is allowed in accordance with the cluster configuration. If access is allowed, the global transaction processing unit 58 initiates a corresponding transaction upon SMP bus 20. In the case of write operations, the global transaction processing unit 58 may cause the data to be written into a particular memory or I/O location. In the case of read transactions, the global transaction processing unit 58 may cause data to be read from a particular memory or I/O location. Following the data access, the global transaction processing unit 58 transmits a completion message (including read data, in the case of reads) through global interconnect 52 to the node from which the transaction was initially received.

Each of the processors 16-1 through 16-m is shown with an internal error status register 66-1 through 66-m, respectively. Each error status register 66 is large enough to hold a transaction error code. If the error handling subsystem 56 of a particular request agent 54 determines that an error has occurred with respect to a particular transaction it is handling, the request agent 54 provides an error code in an acknowledgement message conveyed upon SMP bus 20. In general, both read and write operations performed on SMP bus 20 conclude with an acknowledgement message. For read transactions, the acknowledgement message may be provided in the same phase in which the read data is conveyed to the initiator. For write operations, the acknowledgement message may be communicated in a separate phase on SMP bus 20.

In response to receiving an acknowledgement message indicating an error, the error code is stored within the error status register 66 of the processor that initiated the transaction. Various types of errors may be indicated by the error handling subsystem 56 of a particular request agent 54. For example, in one embodiment, detectable errors include errors reported by a remote node such as access violations including out-of-bounds, destination time out errors, destination busy errors, and so on. For these classes of errors, the request agent receives an encoded error message from the remote node in a global communication conveyed through global interconnect 52. The request agent then passes a corresponding error code to the initiating processor in the acknowledgement message conveyed on SMP bus 20. In addition, errors may also be determined by a request agent itself, such as time-out errors, which may occur, for example, when a remote node does not respond to a transaction.

In accordance with the error reporting mechanism as described above in conjunction with FIG. 4, improved scaling may be attained in embodiments employing multiple system interfaces since only a single error status register needs to be read on an error check or context switch. Additionally, a processor 16 may perform a read to its associated error status register 66 without executing a cycle upon SMP bus 20. It is noted that a particular processor 16 may read its associated error status register using an address dedicated to the internal error status register, or, in other implementations, by executing a specialized instruction.

Other advantages may also be realized. For example, the cost of a system implemented in accordance with the foregoing description may further be reduced, since a separate error status register corresponding to each possible CPU in the system is not incorporated within each of the system interfaces 24.

In one embodiment, before a given transaction is acknowledged on SMP bus 20 to an initiating processor 16, the given transaction must first be completed globally. In this manner, if the request agent 54 handling the transaction determines the global transaction incurred an error, the appropriate error code can be conveyed with the acknowledgement message on SMP bus 20 to the initiating processor 16. The data rate between a processor and a remote node may thus be limited by the number of transactions the processor allows to be outstanding, and by the latency of those transactions' acknowledgements.

Accordingly, to improve performance, in other embodiments certain transactions may be acknowledged upon SMP bus 20 to the initiating processor before the transaction has actually completed globally. This is possible since normally the status of individual transactions is not important (that is, software executing upon a given processor normally would not check the content of a corresponding error status register 66 after every transaction). Instead, software will normally check the status of the corresponding error status register 66 after a group of transactions have completed. Accordingly, in various implementations (including that described below in conjunction with FIG. 5), the request agents 54 may be configured to determine if there are any previous outstanding transactions from the processor issuing a new transaction. If so, those previous transactions may be acknowledged early (that is, before the transactions have completed globally), if desired. Any errors that come back from a remote node which are related to those early-acknowledged transactions can be reported on any later outstanding transaction. It is noted that in such implementations, the last transaction pending in the interface for a given processor must wait until all previous remote transactions have completed globally before it can be acknowledged. Additionally, it is noted that before the error status for a group of transactions can be determined, the last transaction in the group must be completed. In embodiments employing SPARC™ processors, the MEMBAR instruction may be executed to insure completion of all previous transactions. The throughput in embodiments which allow request agents to acknowledge transactions upon SMP bus 20 early may be advantageously limited by the number of transactions the system interface 24 is able to keep track of, instead of by the number of transactions each processor allows to be outstanding.

Figure 5:
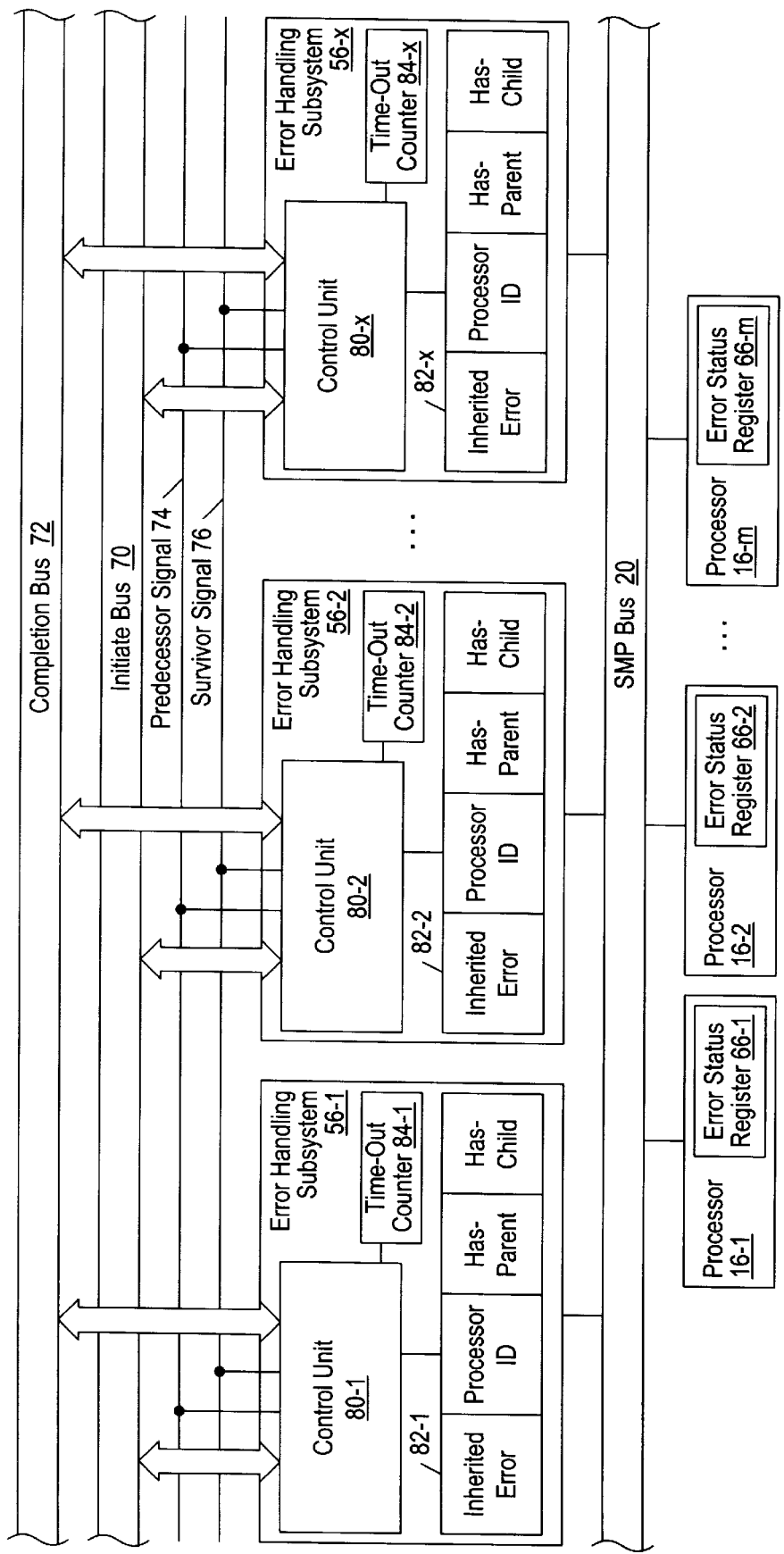
FIG. 5 is a block diagram illustrating aspects of a group of error handling subsystems within a multiprocessor computer system.

FIG. 5 is a block diagram illustrating further aspects of one embodiment of a multiprocessing computer system including a number of error handling subsystems 56-1 through 56-x associated with various request agents 54. The error handling subsystems 56 illustrated in FIG. 5 may reside within a single system interface 24 or within multiple system interfaces. The error handling subsystems 56 are interconnected by an initiate bus 70 and a completion bus 72. It is noted that the initiate bus 70 and completion bus 72 are independent of global interconnect 52.

Each error handling subsystem 56 includes an associated control unit 80-1 through 80-x coupled to a memory or storage unit 82-1 through 82-x, respectively, and to a timeout counter 84-1 though 84-x, respectively. The storage unit 82 of each error handling subsystem 56 includes a field for storing an "inherited error" code, a field for storing a processor id, a field for storing a "has-parent" bit, and a field for storing a "has-child" bit. From FIG. 4, it is noted that a separate error handling subsystem 56 as illustrated in FIG. 5 may be provided for each request agent 54. It is further noted that time-out counters 84 are provided for determining time out errors, which may occur when a response is not received from a remote node in response to a globally transmitted transaction.

During operation, when a request agent accepts a new transaction, the control unit 80 associated with that request agent sets the inherited error field of storage unit 82 to "000" (indicating no error, in this particular example) and clears its has-parent and has-child bits. The associated control unit 80 further sets the processor id field to the initiator of the transaction, and drives the processor id value onto the initiate bus 70.

When a control unit 80 of another error handling subsystem 56 detects a processor id value upon initiate bus 70 which is the same as the processor id stored in its associated storage unit 82, the control unit 80 of that error handling subsystem sets the has-child bit for that error handling subsystem and asserts the predecessor signal at line 74.

If the control unit 80 which is driving the initiate bus 70 detects that the predecessor signal is asserted by another error handling subsystem, it sets its associated has-parent bit. A request agent whose has-child bit is clear and whose has-parent bit is set is referred to herein as being an "heir".

Any non-heir request agent whose child-bit is set may acknowledge a transaction to the processor it is acting on behalf of before that transaction has completed globally (e.g., in the case of a write operation). When it does so, the control unit 80 for that request agent supplies the value contained in its associated inherited error field as the transaction's completion status (in the acknowledgement message provided on SMP bus 20). It is noted that the request agent remains busy (i.e., it cannot accept a new transaction) until the transaction is completed globally.

On the other hand, an heir request agent cannot acknowledge a transaction on SMP bus 20, and must wait until it is no longer an heir. A non-heir request agent with no children (wherein both the has-child bit and has-parent bit are cleared) can acknowledge a transaction on SMP bus 20 when the transaction has completed globally.

When a request agent receives a completion message from a remote node through global interconnect 52, and if the control unit 80 associated with that request agent has already provided an early acknowledgement corresponding to the transaction upon SMP bus 20, the control unit 80 drives the processor id and inherited error code of the associated error handling subsystem upon completion bus 72. At this point, the associated request agent may retire the transaction. Similarly, if the request agent has not yet provided a corresponding acknowledgement upon SMP bus 20, the control unit 80 of that request agent drives its associated processor id and a "000" error status on the completion bus 72. It further acknowledges the transaction upon SMP bus 20. In the acknowledgement message driven upon SMP bus 20, the control unit 80 either drives the value within the inherited error field of the associated storage unit 82 as an error code, or if that is "000", provides whatever error code was received in the global completion message.

Each remaining error handling subsystem 56 monitors the completion bus 72 to determine whether a processor id corresponding to the value stored in the processor id field of its associated storage unit 82 is driven upon completion bus 72. If a control unit 80 detects a conveyance of a processor id corresponding to the processor id value stored in its associated storage unit 82, the control unit 80 asserts the "survivor" signal at line 76 if it is a non-heir agent. If an heir agent detects a conveyance of a corresponding processor id on completion bus 72, the heir agent samples the survivor signal. If the survivor signal is not asserted, that agent clears its associated has-parent bit, and is thus no longer an heir. Regardless of whether the bit is cleared or not, if the agent's inherited error field is 000, it is set to the error status driven on the completion bus.

Figure 6:
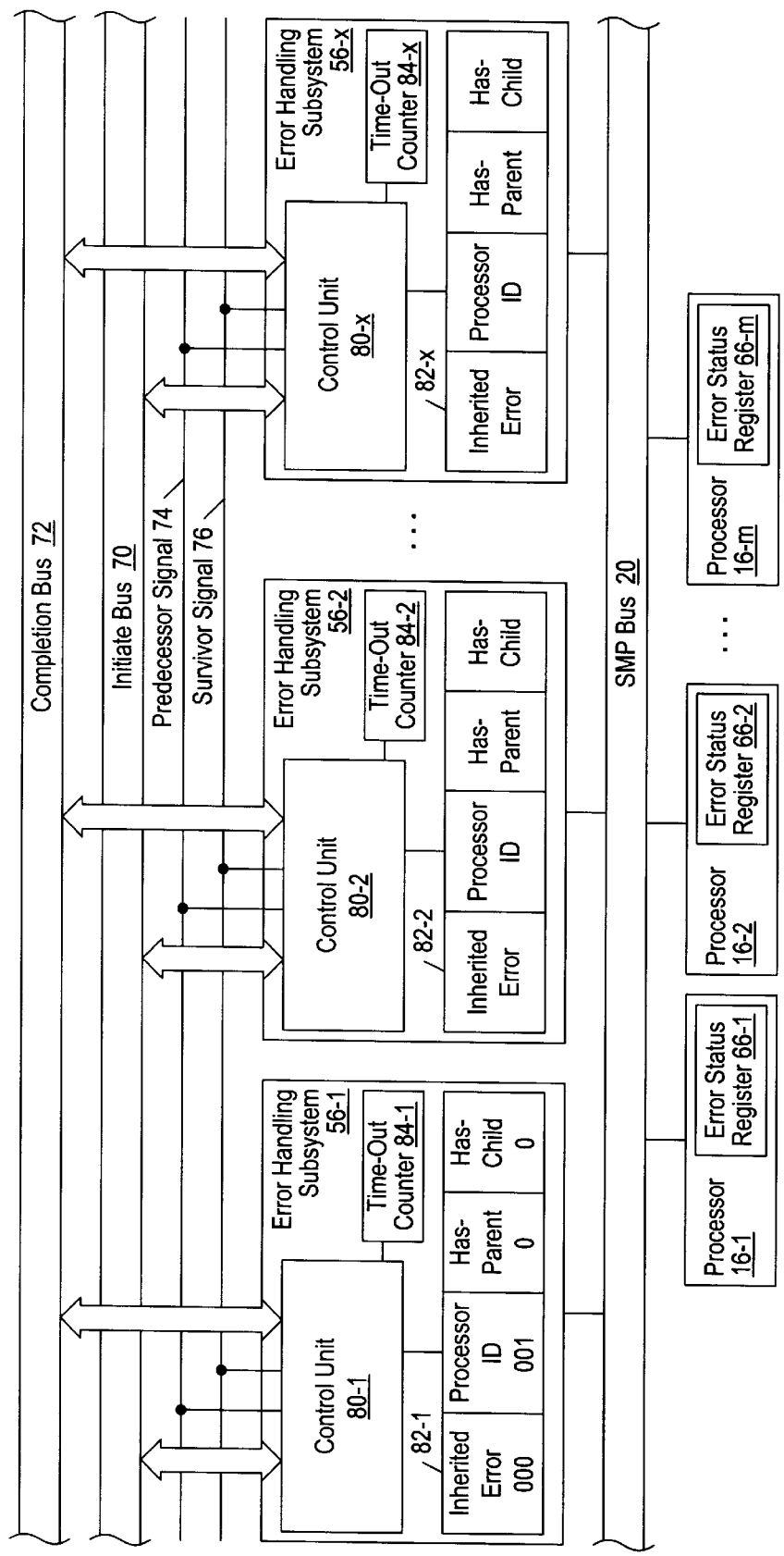
FIGS. 6–8 are block diagrams illustrating operation of the group of error handling subsystems of FIG. 5.
Figure 7:
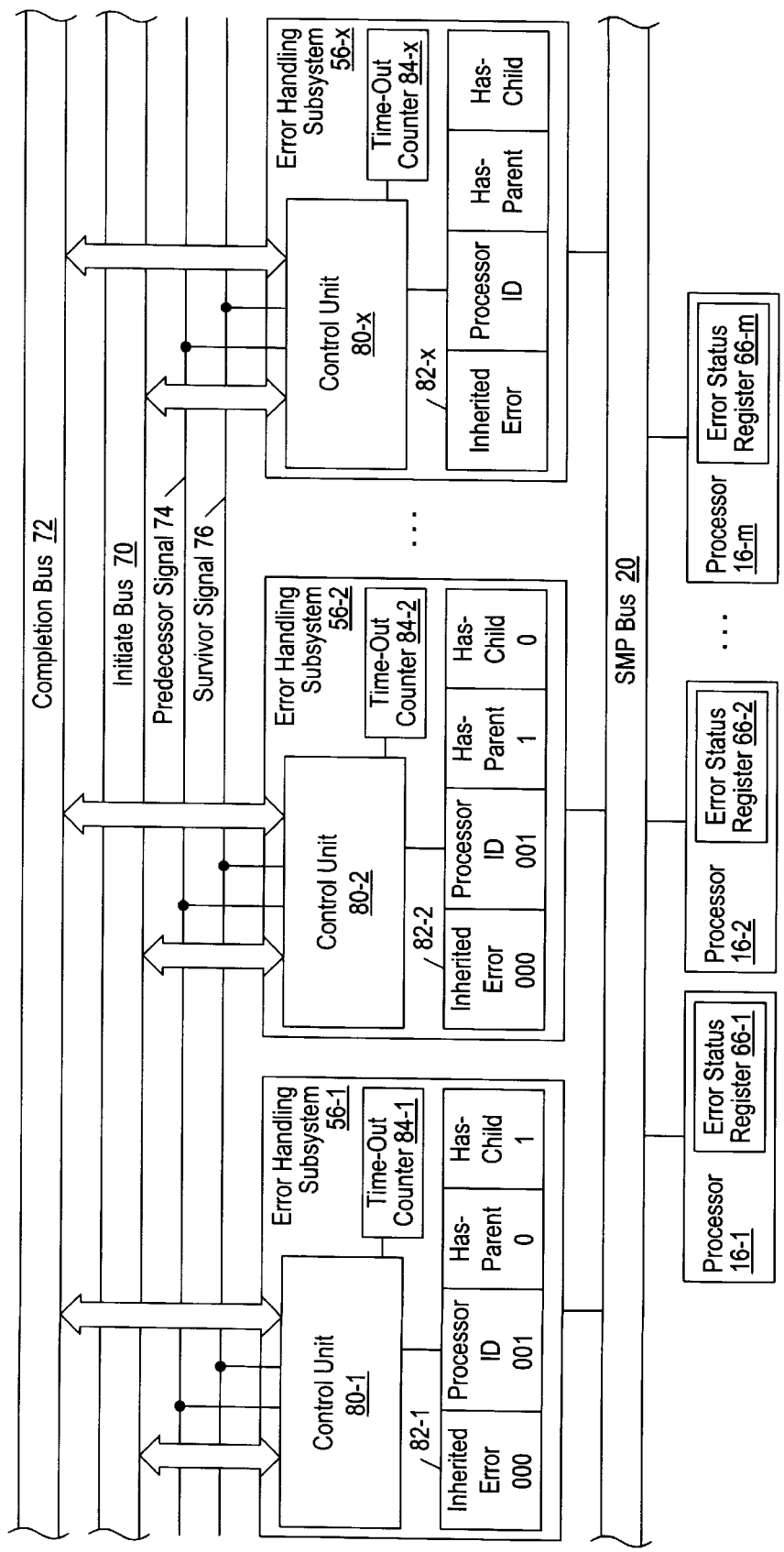
Figure 8:
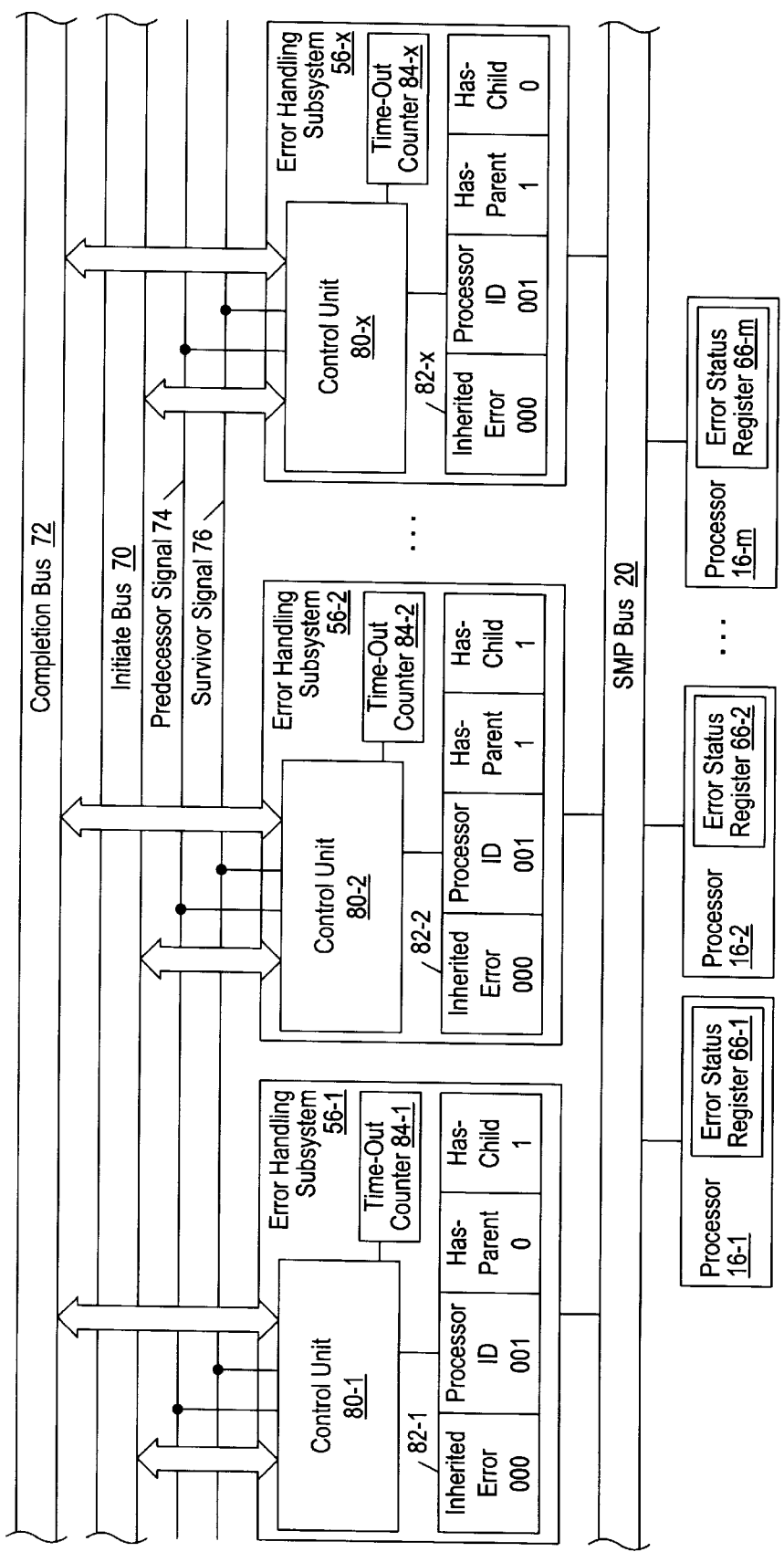

The operation of the error handling subsystems 56 of FIG. 5 may be better understood with reference to the example illustrated in FIGS. 6–8. Referring to FIG. 6, assume processor 16-1 initiates a transaction upon SMP bus 20 that is handled and transmitted globally by the request agent associated with error handling subsystem 56-1.

In response to receipt of this transaction, the error handling subsystem 56-1 sets the processor id field of storage unit 82-1 to a value of, for example, "001", which corresponds to processor 16-1. The control unit 80-1 further sets the inherited error field of storage unit 82-1 to "000" and clears the has-parent and has-child bits, as illustrated. The control unit 80-1 finally drives the processor id value "001" upon the initiate bus 70. At this point it is assumed that the request agents associated with error handling subsystems 56-2 though 56-x have no outstanding transactions.

Next, assume processor 16-1 initiates another transaction upon SMP bus 20 which is handled and transmitted globally by the request agent associated with error handling subsystem 56-2. Similar to the previous operation, the error handling subsystem 56-2 responsively sets its inherited error field to "000", and clears its has-child and has-parent bits. The control unit 80-2 further sets its processor id field to "001" and drives the processor id on the initiate bus 70. At this point, the control unit 80-1 of error handling subsystem 56-1 detects the transmission of the processor id "001" on initiate bus 70 and, since it matches the processor id within storage unit 82-1, control unit 80-1 sets its haschild bit, and asserts the predecessor signal at line 74. In response to the predecessor signal being asserted, the control unit 80-2 sets its has-parent bit. The values stored within storage units 82-1 and 82-2 following these operations illustrated in FIG. 7. As stated previously, a request agent whose has-parent bit is set and whose has-child bit is referred to herein as an "heir".

Assume next that processor 16-1 initiates a transaction upon SMP bus 20 which is handled and transmitted globally by the request agent associated with error handling subsystem 56-x. In response to this operation, control unit 80-x sets the inherited error field of storage unit 82-x to "000" and the processor id field to "001", and clears its has-parent and has-child bits. Control unit 80-x further drives the processor id value on the initiate bus 70. Control unit 80-2 responsively sets the has-child bit of storage unit 82-2, and asserts the predecessor signal at line 74 (it is noted that error handling subsystem 561 may do the same; however, its has-child bit was already set). In response to the predecessor signal being asserted, control unit 80-x sets the has-parent bit of storage unit 82-x. The values stored within each storage unit 82 following these operations are illustrated in FIG. 8.

In the situation illustrated by FIG. 8, the request agent associated with error handling subsystem 82-x is an heir. Since the request agents associated with error handling subsystems 56-1 and 56-2 are not heirs (and have set has-child bits), either could acknowledge the transaction it is handling upon SMP bus 20 to processor 16-1. Thus, consider a situation wherein the request agent associated with error handling 56-1 acknowledges the transaction it is handling (i.e., before the transaction completes globally). In this case, the value "000" within the inherited error field of storage unit 821 is conveyed upon SMP bus 20 in an acknowledgement message, indicating no error. This value may be stored within the error status register 66-1 of processor 16-1.

If the request agent associated with error handling subsystem 56-1 later receives a completion message from a remote node indicating an error, or determines that an error has occurred due to a timeout, for example, control unit 80-1 conveys the corresponding error code upon completion bus 72, along with the processor id "001". At this point, the request agent associated with error handling subsystem 56-1 may be retired, and is available to accept new transactions. If no error is indicated, an error code value of "000" (indicating no error) is conveyed upon completion bus 72 along with the processor id.

In response to control unit 80-1 conveying the error code upon completion bus 72, control unit 80-2 asserts the survivor signal, since it is a non-heir agent. Additionally, since the request agent associated with control unit 80-x is an heir agent, control unit 80-x samples the survivor signal. Since in this case the survivor signal is asserted by control unit 80-2, the has-parent bit of storage unit 82-x is not cleared, and the request agent associated with error handling subsystem 56-x remains an heir (note that if the survivor signal was not asserted, the parent-bit would be cleared). The error code conveyed upon completion bus 72 is, however, stored within the inherited error field of storage unit 82-x. This value may later be conveyed in an acknowledgement message upon SMP bus 20 when error handling subsystem 56-x is allowed to acknowledge its corresponding transaction. Operations in accordance with the foregoing description are performed in response to subsequent transactions initiated by processor 16-1, and in response to the acknowledgements of other transactions.

Software executing on a particular processor can periodically read the error status register 66 associated with that processor to determine if any error has been recorded since the last time it read the error status register. This may be accomplished by performing a read operation to a particular address in the address space of the system (i.e., to an address each error status register 66 is mapped). In other embodiments, a specialized instruction may be defined to allow access to each error status register 66.

The systems described above may advantageously allow per-processor error status registers to be saved and restored on processor contact switches, thus providing virtual per-application cluster error status registers to every operating system process. The systems may further allow for efficient and scalable implementations of user and kernel-level communication protocols with error reporting. Errors may be reported without processor faults or traps.

Numerous variations and modifications will become apparent to those skilled in the art once the above disclosure is fully appreciated. It is intended that the following claims be interpreted to embrace all such variations and modifications.

What is claimed is:

1. A subsystem for a multiprocessing computer system, said subsystem comprising:
    a first processor coupled to a local bus, said first processor including a first error status register;
    a second processor coupled to said local bus, said second processor including a second error status register;
    a system interface coupled to said local bus, wherein said system interface is configured to receive transactions directed to one or more remote nodes which are initiated by said first and second processors, wherein said system interface is configured to provide a first error code to be stored within said first error status register in response to a first error being generated as a result of a first transaction initiated by said first processor, and wherein said system interface is configured to provide a second error code to be stored within said second error status register in response to a second error being generated as a result of a second transaction initiated by said second processor.

2. The subsystem as recited in claim 1 wherein said system interface is configured to provide said first error code to said first error status register via an acknowledgement message conveyed upon said local bus.

3. The subsystem as recited in claim 1 wherein said system interface includes a first request agent configured to convey a global transaction corresponding to said first transaction to a first remote node on behalf of said first processor, and wherein said system interface includes a second request agent configured to convey to said first remote node another global transaction corresponding to a subsequent transaction by said first processor.

4. The multiprocessing computer system as recited in claim 3, wherein said first request agent includes a first storage unit configured to store said first error code, and wherein said second request agent includes a second storage unit configured to store a third error code.

5. The multiprocessing computer system as recited in claim 4 wherein said first request agent is configured to provide an acknowledgement message to said first processor prior to said global transaction completing within said first remote node.

6. The multiprocessing computer system as recited in claim 5 wherein said second request agent is configured to convey a second acknowledgement message upon said local bus to said first processor in response to said subsequent transaction, wherein said second acknowledgement message includes said first error code.

7. The multiprocessing computer system as recited in claim 6 wherein said first processor includes an internal error status register, and wherein said first processor is configured to store said first error code within said internal error status register in response to said second acknowledgement message.

8. A multiprocessing computer system comprising a plurality of processing nodes and a global interconnect network interconnecting said plurality of processing nodes, wherein a first node includes:
    a plurality of processors;
    a memory coupled to said plurality of processors through a local bus; and
    a system interface for receiving local transactions initiated by said plurality of processors on said local bus which are destined to remote nodes;
    wherein each of said plurality of processors includes an error status register configured to store information regarding an error associated with a global transaction conveyed upon said global interconnect network by said system interface that corresponds to one of said local transactions;
    wherein said system interface is configured to generate an acknowledgement message in response to a given transaction.

9. The multiprocessing computer system of claim 8, wherein said system interface is configured to convey said acknowledgement message to a given processor that initiated said given transaction through said local bus.

10. The multiprocessing computer system as recited in claim 9 wherein said given processor is configured to initiate said given transaction upon said local bus, and wherein said system interface includes a request agent configured to receive said given transaction and to convey said given transaction to a remote target node on behalf of said given processor.

11. The multiprocessing computer system of claim 10, wherein said request agent is configured to provide an error code with said acknowledgement message in response to receiving an error message from said remote target node.

12. The multiprocessing computer system of claim 11, wherein said error code is indicative of a time-out error conveyed by said remote target node.

13. The multiprocessing computer system of claim 11, wherein said error code is indicative of an access violation.

14. The multiprocessing computer system as recited in claim 10, wherein said request agent is configured to provide an error code with said acknowledgement message in response to detecting an error associated with said given transaction.

15. The multiprocessing computer system of claim 14, wherein said error code is indicative of a time-out error determined by said request agent.

16. The multiprocessing computer system as recited in claim 9, wherein said acknowledgement message is encodable to indicate an error.

17. The multiprocessing computer system as recited in claim 16, wherein said system interface includes a first request agent configured to convey said given transaction to a first remote node on behalf of said given processor, and wherein said system interface includes a second request agent configured to convey a second transaction to a second remote node on behalf of said given processor.

18. The multiprocessing computer system as recited in claim 17, wherein said first request agent includes a first storage unit configured to store a first error code, and wherein said second request agent includes a second storage unit configured to store a second error code.

19. The multiprocessing computer system as recited in claim 18 wherein said first request agent is configured to provide said acknowledgement message to said given processor prior to said given transaction completing within said first remote node.

20. The multiprocessing computer system as recited in claim 19 wherein said second request agent is configured to store a given error code generated in response to said given transaction, and wherein said second request agent is configured to convey a second acknowledgement message upon said local bus to said given processor in response to said second transaction, wherein said second acknowledgement message includes said given error code.

21. The multiprocessing computer system as recited in claim 20 wherein said given processor includes an internal error status register, and wherein said given processor is configured to store said given error code within said internal error status register in response to said second acknowledgement message.

22. A processor for use in a first node of a multiprocessing computer system that is interconnected with a plurality of additional processing nodes through a global interconnect network, wherein said first node includes a system interface for receiving transactions from said processor which are destined to at least one of said additional processing nodes, said processor comprising:

a processor core configured to initiate said transactions;

an error status register coupled to said processor core and configured to store error information regarding an error associated with a global transaction conveyed upon said global interconnect network by said system interface that correponds to a given transaction initiated by said processor core;

a bus interface configured to receive said error information from said system interface; and software code executable to periodically poll said error status register to detect an error associated with said global transaction.

23. The processor of claim 22, wherein said error information is indicative of a time-out error associated with said global transaction.

24. The processor of claim 22, wherein said error information is indicative of an access violation indicated by one of said additional processing nodes.

* * * * *